US010841413B1

(12) United States Patent
Pentakota et al.

(10) Patent No.: US 10,841,413 B1
(45) Date of Patent: Nov. 17, 2020

(54) SYSTEMS AND METHODS FOR USING AN AUDIO CROSS-CONNECT CABLE FOR REMOTE MOBILE DEVICE TESTING

(71) Applicant: Spirent Communications, Inc., San Jose, CA (US)

(72) Inventors: Revanth K. Pentakota, McKinney, TX (US); Laukik R. Deshpande, McKinney, TX (US); Dat Phan, Campbell, CA (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 16/733,126

(22) Filed: Jan. 2, 2020

(51) Int. Cl.

| H04M 3/42 | (2006.01) |
|---|---|
| H04M 1/725 | (2006.01) |
| H04W 4/029 | (2018.01) |
| H04M 1/57 | (2006.01) |
| H04W 64/00 | (2009.01) |
| H04L 29/08 | (2006.01) |
| H04W 4/16 | (2009.01) |
| H04M 3/54 | (2006.01) |

(52) U.S. Cl.
CPC ........ *H04M 1/72522* (2013.01); *H04L 67/18* (2013.01); *H04M 1/57* (2013.01); *H04M 3/54* (2013.01); *H04W 4/029* (2018.02); *H04W 4/16* (2013.01); *H04W 64/003* (2013.01)

(58) Field of Classification Search
CPC ...... H04M 1/72519; H04M 1/57; H04M 2/54; H04M 4/16; H04W 4/029; H04W 64/003; H04L 67/18

USPC .......... 455/417, 423, 67.1, 550.1; 379/88.18
See application file for complete search history.

(56) References Cited

U.S. PATENT DOCUMENTS

| 6,201,853 B1 * | 3/2001 | Butler ..................... H04M 1/24 379/21 |
|---|---|---|
| 9,167,079 B1 * | 10/2015 | Capecci ................ H04M 3/229 |
| 9,398,466 B1 * | 7/2016 | Joung ................... H04W 24/06 |
| 2007/0153088 A1 * | 7/2007 | Hales ..................... H04N 17/00 348/181 |
| 2010/0135474 A1 * | 6/2010 | Smith ................... H04M 3/229 379/88.18 |

(Continued)

*Primary Examiner* — Danh C Le
(74) *Attorney, Agent, or Firm* — Haynes Beffel & Wolfeld, LLP; Ernest J. Beffel, Jr.

(57) ABSTRACT

The disclosed technology teaches ad hoc testing a connection between subscriber mobile phone and counterpart location with which the subscriber is having trouble, including positioning a test harness near the location, remote from the subscriber and from a service technician. The harness includes a controller, two mobile phones with an audio cross-over cable connection between, and control connections between controller and phones. The cable feeds output of respective speakers to respective microphones and inhibits transmission between the phones of signals for button presses. The controller receives a test start signal from the technician and establishes a test connection between technician equipment and subscriber equipment through the counterpart location, establishing a call connection between the first phone and the technician equipment; and establishing a second test call connection between the second phone and the subscriber phone, so the technician and subscriber have an audio connection over the audio cross-over cable.

20 Claims, 14 Drawing Sheets

(56) References Cited

U.S. PATENT DOCUMENTS

| | | | |
|---|---|---|---|
| 2014/0344874 A1* | 11/2014 | Olsen | H04N 17/004 |
| | | | 725/107 |
| 2017/0104527 A1* | 4/2017 | Sinde | G01M 11/00 |
| 2017/0141845 A1* | 5/2017 | Totten | H04B 10/0771 |
| 2018/0149687 A1* | 5/2018 | Backus | G01R 31/008 |
| 2019/0116506 A1* | 4/2019 | Bendlin | H04W 64/003 |
| 2019/0280438 A1* | 9/2019 | German | H04Q 1/13 |
| 2019/0280504 A1* | 9/2019 | Lee | H04M 1/02 |

\* cited by examiner

FIG. 3 Reference Headset Test Circuit (Prior Art)

| ☒ | sip \|\|amr | | | | | |
|---|---|---|---|---|---|---|
| No. | Time | Source | Destination | Protocol | Length | Info |
| 1 | 0.000000 | 2600:2:8129:6a97:0:b:b3f9:1401 | 2600:2:c082:36::18 | SIP | 1045 | Request: REGISTER sip:imcns.spcsdns.net (1 binding)| |
| 2 | 0.401031 | 2600:0:c082:36::18 | 2600:2:8129:6a97:0:b:b3f9:1401 | SIP | 639 | Status: 401 Unauthorized \| |
| 3 | 0.521188 | 2600:2:8129:6a97:0:b:b3f9:1401 | 2600:2:c082:36::18 | SIP | 1203 | Request: REGISTER sip:imcns.spcsdns.net (1 binding)| |
| 4 | 0.942188 | 2600:0:c082:36::18 | 2600:2:8129:6a97:0:b:b3f9:1401 | SIP | 960 | Status: 200 OK (1 binding) \| |
| 5 | 0.987250 | 2600:2:8129:6a97:0:b:b3f9:1401 | 2600:2:c082:36::18 | SIP | 1031 | Request: SUBSCRIBE sip:+19519635725@imcns.spcs |
| 6 | 1.111344 | 2600:0:c082:36::18 | 2600:2:8129:6a97:0:b:b3f9:1401 | SIP | 607 | Status: 200 OK \| |
| 11 | 1.157188 | 2600:2:8129:6a97:0:b:b3f9:1401 | 2600:2:c082:36::18 | SIP | 1106 | Request: NOTIFY sip:+19519635725@imcns.spcsdns |
| 13 | 1.194156 | 2600:0:c082:36::18 | 2600:2:8129:6a97:0:b:b3f9:1401 | SIP | 843 | Status: 200 OK \| |
| 21 | 42.167250 | 2600:2:8129:6a97:0:b:b3f9:1401 | 2600:0:c082:36::18 | SIP/S... | 993 | Request: INVITE sip:*2729132768140;phone-context |
| 24 | 42.241781 | 2600:0:c082:36::18 | 2600:2:8129:6a97:0:b:b3f9:1401 | SIP | 519 | Status: 100 Trying \| |
| 206 | 46.632031 | 2600:0:c082:36::18 | 2600:2:8129:6a97:0:b:b3f9:1401 | SIP | 892 | Status: 183 Session Progress \| |
| 208 | 46.712000 | 2600:0:c082:36::18 | 2600:2:8129:6a97:0:b:b3f9:1401 | SIP | 883 | Status: 180 Ringing \| |
| 211 | 50.601938 | 2600:0:c082:36::18 | 2600:2:8129:6a97:0:b:b3f9:1401 | SIP/S... | 128 | Status: 200 OK \| |
| 214 | 50.662219 | 2600:2:8129:6a97:0:b:b3f9:1401 | 2600:0:c082:36::18 | SIP | 928 | Request: ACK sip:mavodi - s~ws~xuwytw_0~10d~d0~ |
| 215 | 50.680906 | 2600:2:8129:6a97:0:b:b3f9:1401 | 2600:0:c082:36::36 | AMR | 67 | PT=AMR, SSRC=0x3000CA, Seq=10168, Time=3146 |
| 216 | 50.682344 | 2600:2:8129:6a97:0:b:b3f9:1401 | 2600:0:c082:36::36 | ICMPv6 | 115 | Destination Unreachable (Port unreachable) |
| 217 | 50.787250 | 2600:0:c082:36::36 | 2600:2:8129:6a97:0:b:b3f9:1401 | AMR | 92 | PT=AMR, SSRC=0x5B1DE46F, Seq=1, Time=512, |
| 218 | 50.806281 | 2600:0:c082:36::36 | 2600:2:8129:6a97:0:b:b3f9:1401 | AMR | 92 | PT=AMR, SSRC=0x5B1DE46F, Seq=2, Time=672 |
| 219 | 50.837250 | 2600:2:8129:6a97:0:b:b3f9:1401 | 2600:0:c082:36::36 | AMR | 67 | PT=AMR, SSRC=0x3000CA, Seq=10169, Time=3146 |

> Frame 21: 993 bytes on wire (7944 bits), 993 bytes captured (7944 bits) on interface 0
  Raw packet data
> Internet Protocol Version 6, Src: 2600:2:8129:6a97:0:b:b3f9:1401, Dst: 2600:0:c082:36::18
> Transmission Control Protocol, Src Port: 45278, Dst Port: 5060, Seq: 1189, Ack: 1, Len: 921
> [2 Reassembled TCP Segments (2109 bytes): #20(1188), #21(921)]
> Session Initiation Protocol (INVITE)
  > Request-Line: INVITE sip:*2729132768140;phone-context=imcns . spcsdns . net@imcns . spcsdns . net;user=phone SIP/2.0
  ∨ Message Header
   > Via: SIP/2.0/TCP [2600:2:8129:6a97:0:b:b3f9:1401] :5050;branch=z9hG4bK-524287-1---d765720a0b09e71;rport;transport=TCP
     Max-Forwards: 70
   > Route: <sip:[2600:0:c082:36::18] :5060;lr>
   > Contact: <sip:+19519635725@imcns . spcsdns . net;fr=urn:gsma:imei:35848109-111258-0>;+sip . instance="<urn:gsma:imei:35848109-111258-...
   > To: <sip:*2729132768140;phone-context=imcns . spcsdns . net@imcns . spcsdns . net;user=phone>
   > From: <sip:+19519635725@imcns . spcsdns . net>;tag=a236852f
     Call-ID: hMrEYuEbqLiuWk0b7qMDbQ..@2600:2:8129:6a97:0:b:b3f9:1401
     [Generated Call-ID: hMrEYuEbqLiuWk0b7qMDbQ..@2600:2:8129:6a97:0:b:b3f9:1401]
     CSeq: 1 INVITE
     Session-Expires: 1800
     Accept: application/sdp, application/3gpp-ims+xml
     Allow: INVITE, ACK, OPTIONS, CANCEL, BYE, UPDATE, INFO,REFER, NOTIFY, MESSAGE, PRACK
     Content-Type: application/sdp
     Supported: timer, 100rel, precondition, gruu
     User-Agent: SM-G950U-G950USQU5CRIB Samsung IMS 6.0

FIG. 10

SYSTEMS AND METHODS FOR USING AN AUDIO CROSS-CONNECT CABLE FOR REMOTE MOBILE DEVICE TESTING

FIELD OF THE TECHNOLOGY DISCLOSED

The technology disclosed relates generally to audio testing in telecommunications, such as voice over long-term evolution (VoLTE), fourth-generation mobile networks (4G) and fifth-generation mobile networks (5G) for high-speed wireless communication for mobile phones. More specifically, the technology discloses debugging call connectivity and audio issues using a connection between a mobile device and a distinct mobile device at a location with which the user is having trouble, in a wireless or cellular communications network. The disclosed technology also relates to automated testing of a connection between a first location and a second location through a counterpart location.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

The Internet and other networks are designed to distribute traffic over alternative routes, compensating for congestion and outages along some routes. Cellular networks are similarly designed to connect available cellular phones to base stations that provide good service. Under some conditions, this may not be the closest base station for the base station with the strongest signal. Congestion at the closest base station may result in routing over a different base station. In the cellular backhaul network, congestion in one data center may result in the base station communicating through a different data center to complete a coast-to-coast cellular connection.

A service engineer located in Texas, for instance may be called upon to experience and diagnose cellular communications in Washington D.C. The cellular base station on the outskirts of Washington D.C. may, at times, route cellular communications traffic with Texas through a Maryland data center, instead of a Washington D.C. data center. This presents a problem for the service engineer who is being asked to experience and diagnose cellular communications within the Metro DC area.

In another example, after an earthquake or other emergency, mass calling by the public often triggers congestion in landline and cellular networks, forcing senior leadership, emergency responders and other key personnel to compete with the public for the same overloaded communications resources. The National Communications System, a Federal Department of Homeland Security agency, provides two priority telecommunications services that authorized national security and emergency preparedness (NS/EP) users can access to significantly increase the probability of completing calls during periods of network congestion or when network capacity has been impaired: wireless priority service (WPS) and government emergency telecommunications service (GETS).

Cellular congestion usually occurs in the local cell. WPS provides priority on the radio connection between the user's cell phone and the cell tower. WPS is an add-on feature to existing cellular service subscribed on a per-cell phone basis. GETS is utilized via an emergency calling card that can be used from virtually any telephone to provide priority for emergency calls. GETS is available to hospitals and other organizations responsible for emergency preparedness, response, and recovery; and GETS uses the full capacity of the public network. Wireless Priority Service (WPS) provides priority for emergency calls made from cell phones. The U.S. government requires all WPS service providers to have high service availability, so most service providers need a user equipment-based solution to test and debug their networks.

Audio testing in telecommunications requires the ability to debug call connectivity and audio issues during a call. Existing audio testing solutions have used modems and software audio routing, which results in low quality audio. Instead of relying on existing audio testing that uses modems that do not deliver true customer experience results, providers of telecommunications services need to make use of user equipment handsets for audio testing.

An opportunity arises of ad hoc testing a connection between a subscriber mobile phone and a counterpart location with which the subscriber is having trouble, and of automated testing a connection between a first location and a second location through a counterpart location.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches systems and methods for ad hoc testing a connection between a subscriber mobile phone and a counterpart location with which the subscriber is having trouble, including positioning a test harness near the counterpart location, remote from the subscriber and from a service technician. The test harness includes a controller, first and second mobile phones, an audio cross-over cable connection between the mobile phones, and control connections between the controller and the mobile phones, and the audio cross-over cable adapts impedance and resistance of the connection between the first and second mobile phones to feed output of respective speakers to respective microphones, according to specifications for the mobile phone, and inhibits transmission between the first and second phones of signals that match the mobile phone specifications for button presses. The disclosed method includes the controller receiving a test start signal from the service technician and establishing a test connection between service technician equipment and subscriber equipment through the counterpart location, including establishing a first test call connection between the first mobile phone and the service technician equipment, and establishing a second test call connection between the second mobile phone and the subscriber mobile phone, whereby the service technician and the subscriber have an audio connection over the audio cross-over cable.

In another embodiment the disclosed technology teaches automated testing a connection between a first location and a second location through a counterpart location, including positioning a test harness near the counterpart location, remote from the first location and the second location. The test harness includes a counterpart controller, first and second mobile phones, an audio cross-over cable connection between the mobile phones, and control connections between the test controller and the mobile phones, and the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses. The counterpart controller receives a test start signal and establishes a test connection between first and second equipment at the first and second locations, respectively, through the counterpart location, including establishing a first test call connection between the first mobile phone and first equipment at the first location, and establishing a second test call connection between the second mobile phone and second equipment at the second location, whereby the equipment at the first and second locations have an audio connection over the audio cross-over cable. The disclosed method includes conducting an automated test of audio communications between the first and second locations through the counterpart location.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 6A shows an example user interface, usable by test engineer for setting up user equipment (UE) for mobile device B, for a WPS test.

FIG. 6B illustrates an example user interface for setting up mobile phone A, for a WPS test.

FIG. 10 illustrates an example snippet of a Wireshark log for a WPS test.

DETAILED DESCRIPTION

Figure 1:
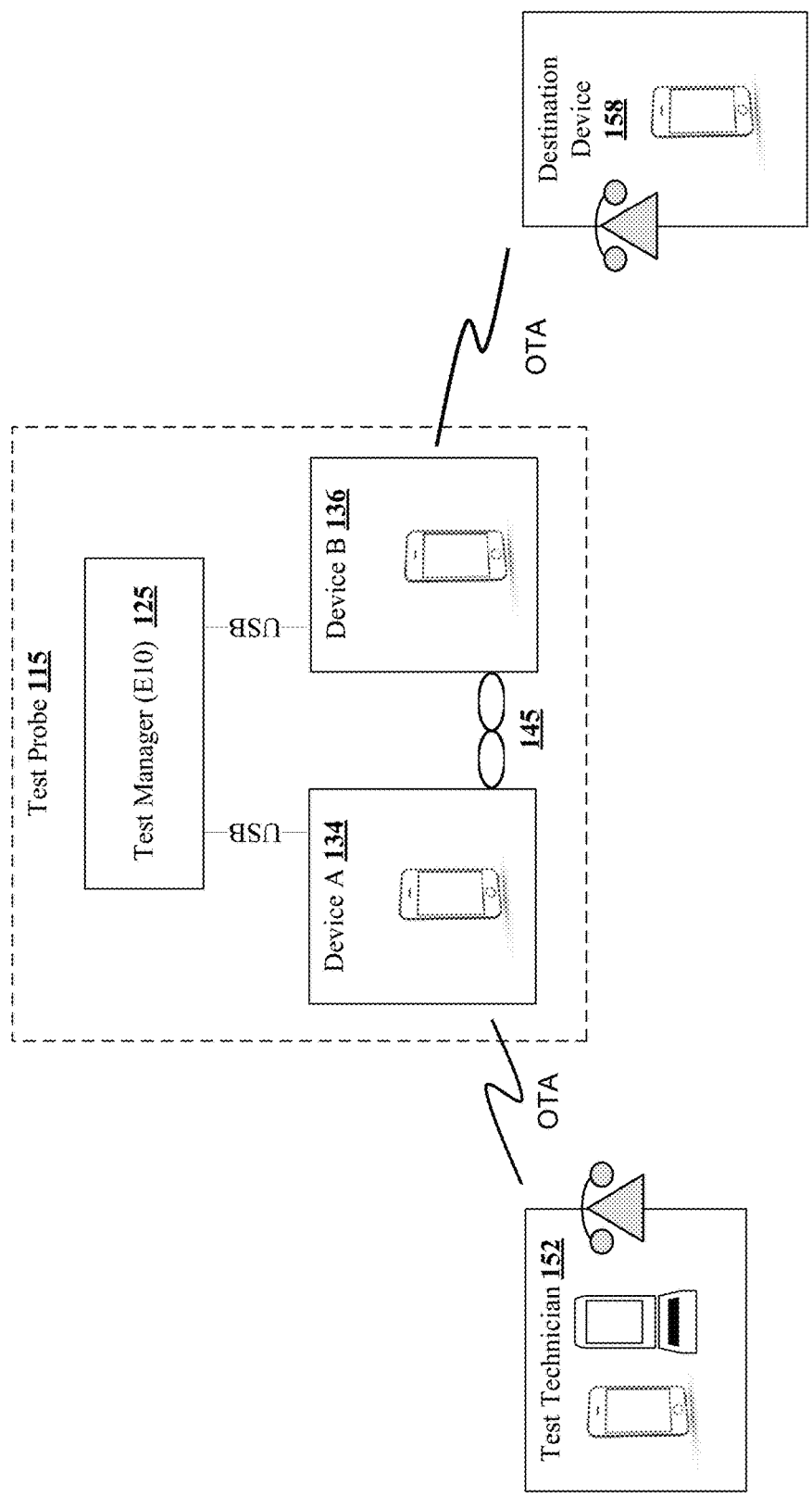
FIG. 1 depicts an exemplary system for testing a connection between a mobile phone and a particular location with which the user is having trouble connecting, without being near that location, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A test engineer needs to be able to test a connection between a subscriber mobile phone and a particular location with which the subscriber is having trouble. The problematic route needs to be tested using real commercially available mobile phones instead of simulated phones, so the engineer can accurately evaluate customer experience.

Mobile phone handsets can be placed in different network locations and can make automated calls. Historically, networks deploy mobile device handsets and make automated tests and measure call connectivity and audio quality using complex algorithms, but this method does not allow any person to listen in on an active call. Also, if the call is connected as a conference call, the call will take a different audio path through the network. For example, in the case of voice over long-term evolution (VoLTE), for conference calls, the terminating point is IP Multimedia Subsystem (IMS) which will merge the audio calls and relay to all connected parties. Hence, one needs a solution which does not alter the original audio path in a call, and a way to hear the audio and interact with the subscriber who is having trouble.

The following solution will enable test engineers to keep the audio path the same and also enable the ability to hear and interact with the destination handset from a location different from the call origination location. One application of the solution is debugging call connectivity and audio issues during a call. For example, a call can be made to a target device from different locations to identify locations experiencing faults.

In one example, the remote location is Washington D.C. and the service engineer in Texas can experience cellular communications in Washington directly, to solve the problem of experiencing and diagnosing problematic cellular communications within the Metro DC area. This is accomplished by pairing first and second cellular phones at the specific location in Washington D.C. and coupling them with a specially designed audio cross-connect cable.

A disclosed audio cross-connect cable for consumer-grade cellular phones is designed to transfer the microphone audio from one mobile phone to the speaker (left/right channel) of another mobile phone and vice-versa. This has wide applications for audio testing in telecommunications, such as VoLTE call quality.

The disclosed technology positions a test harness—with a controller, two consumer-grade cellular phones connected via the specially designed audio cross-over cable, and control connections between the controller and the mobile phones, in a remote location relative to the physical location of a service engineer. The destination device of the subscriber, whose cellular communications need to be diagnosed, is also located at a distinct remote location relative to the engineer. This placement enables the service engineer, who is being asked to experience and diagnose cellular communications remotely, to experience cellular communications over the remotely located phones to solve the problem of debugging call connectivity and audio issues during a call.

Historically, mobile phones have provided voice call services over a circuit-switched-style network, rather than strictly over an IP packet-switched network. The IMS architectural framework for delivering IP multimedia services standardizes alternative methods of delivering voice (VoIP) or other multimedia services available on smartphones. The disclosed technology applies to VoLTE/4G and 5G networks. Next, we describe an example architecture for ad hoc testing of a connection between a subscriber mobile phone and a counterpart location with which the subscriber is having trouble. The architecture is also useful for automated testing of a connection between a first location and a second location through a counterpart location.

Architecture

FIG. 1 shows example architecture 100 for automated testing and ad hoc testing of a cellular connection from a specific location without being near that location. Architecture 100 is useful for testing a connection between a subscriber's mobile phone and a particular location with which the subscriber is having trouble connecting. Architecture 100 includes test manager 125 which is usable by mobile network operators and mobile equipment manufacturers for testing during development, verification, network design, deployment and maintenance. Test manager 125 can record reference audio, transmitted audio and received audio, collect logs and post-process the message logs and transmitted and received audio, as well as performing additional functions. Test manager 125 supports testing of Wi-Fi and IMS networks, including over-the-air LTE testing as well as mobile core which enables a device with wireless capabilities to connect to the cellular network independent of its radio technologies. Test manager 125 is implemented using a Spirent E10 configured as a test server connected to at least one of a set of standalone test controllers in one case for automated testing and can alternatively operate standalone for ad hoc testing in a second case.

Architecture 100 also includes a control connection between test manager 125 and device A handset 134 and a control connection between test manager 125 and device B handset 136. The control connections can be via wired connection or wireless connection and are via USB in one implementation. Device A handset 134 and device B handset 136 are consumer grade devices available at retail outlets. The two handsets are Android phones, in one implementation. The handsets could be devices manufactured by a different provider in another implementation. Wi-Fi from a test harness and the mobile device can be used in a different implementation. Also, handsets 134/136/152/158 could be controlled by sending events from anywhere like Internet to an app on the phone to make the calls and then upload the logs to cloud.

Figure 4:
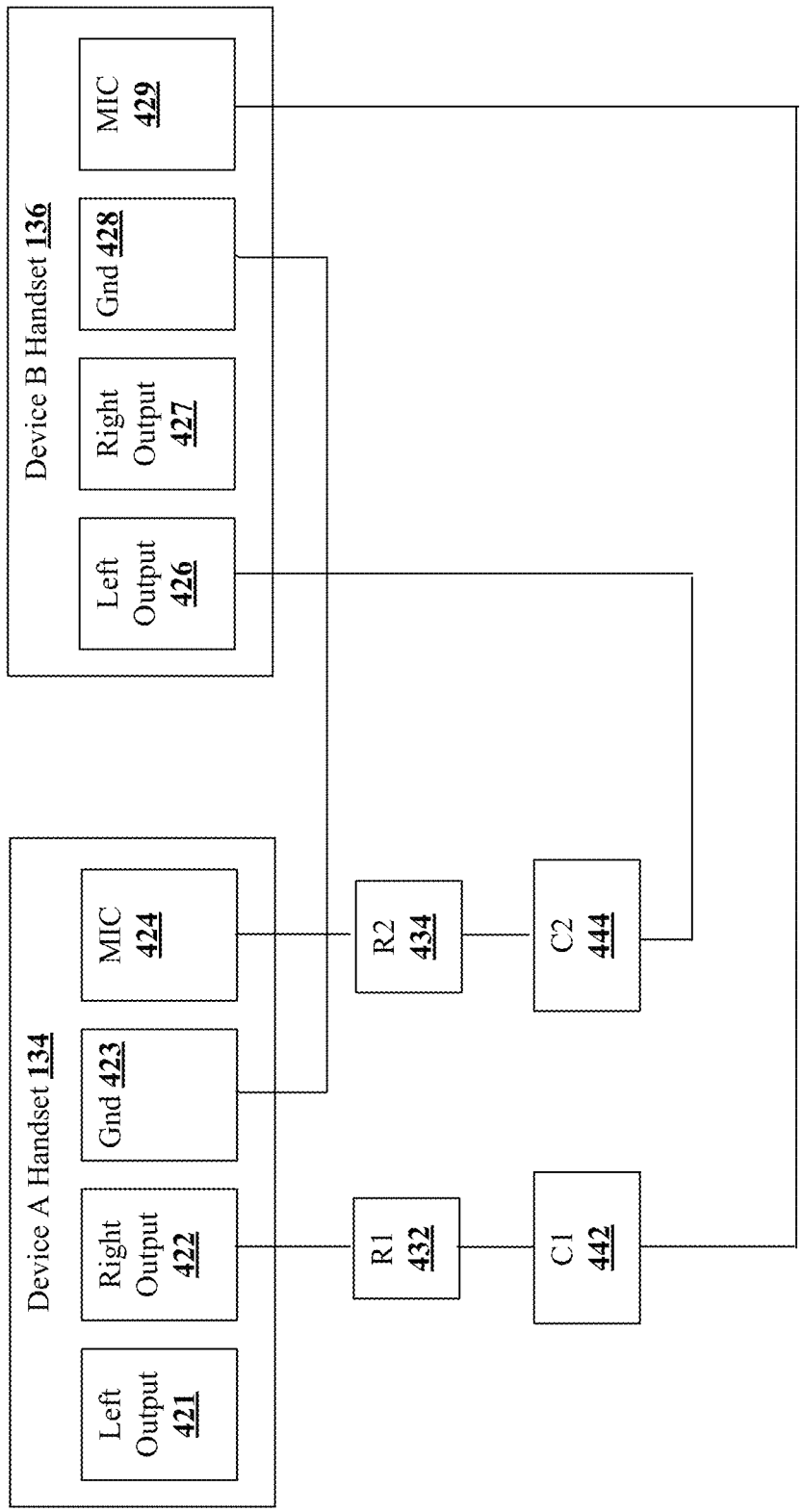
FIG. 4 shows connections for a disclosed audio cross-connect cable, for use between two reference headsets, which are each similar to the reference headset of FIG. 3.

Architecture 100 also includes disclosed audio cross-connect cable 145 that connects device A handset 134 and device B handset 136. Audio cross-over cable 145 adapts resistance and capacitive values to feed output of respective speakers to respective microphones, according to the mobile phone electrical specifications, and further prevents generation of signals with impedance values that match specification for button presses, while minimizing audio quality impairment. Cross-connect cable 145 is plugged into each of the pair of consumer-grade cellular phones, device A 134 and device B 136, and is designed to transfer the microphone audio from device A handset 134 to the speaker of device B handset 136 and the microphone audio from device B handset 136 to the speaker of device A handset 134. FIG. 4 shows the technical design of audio cross-connect cable 145 which is described in detail infra.

Continuing the description of FIG. 1, architecture 100 further includes test technician 152 who is a customer support person using a consumer grade mobile device available at retail outlets, in one use case. Architecture 100 also includes destination phone 158, which can be any device that includes the functionality of sending and receiving calls over the air. Destination phone 158 is a consumer-grade cellular phone, in one implementation. Destination phone 158 is the particular mobile device with which the subscriber is having trouble connecting, in one case. Test technician 152 communicates over the air (OTA) with device A 134. Device B 136 communicates over the air (OTA) with destination device 158, as described relative to FIG. 2 next.

Figure 2:
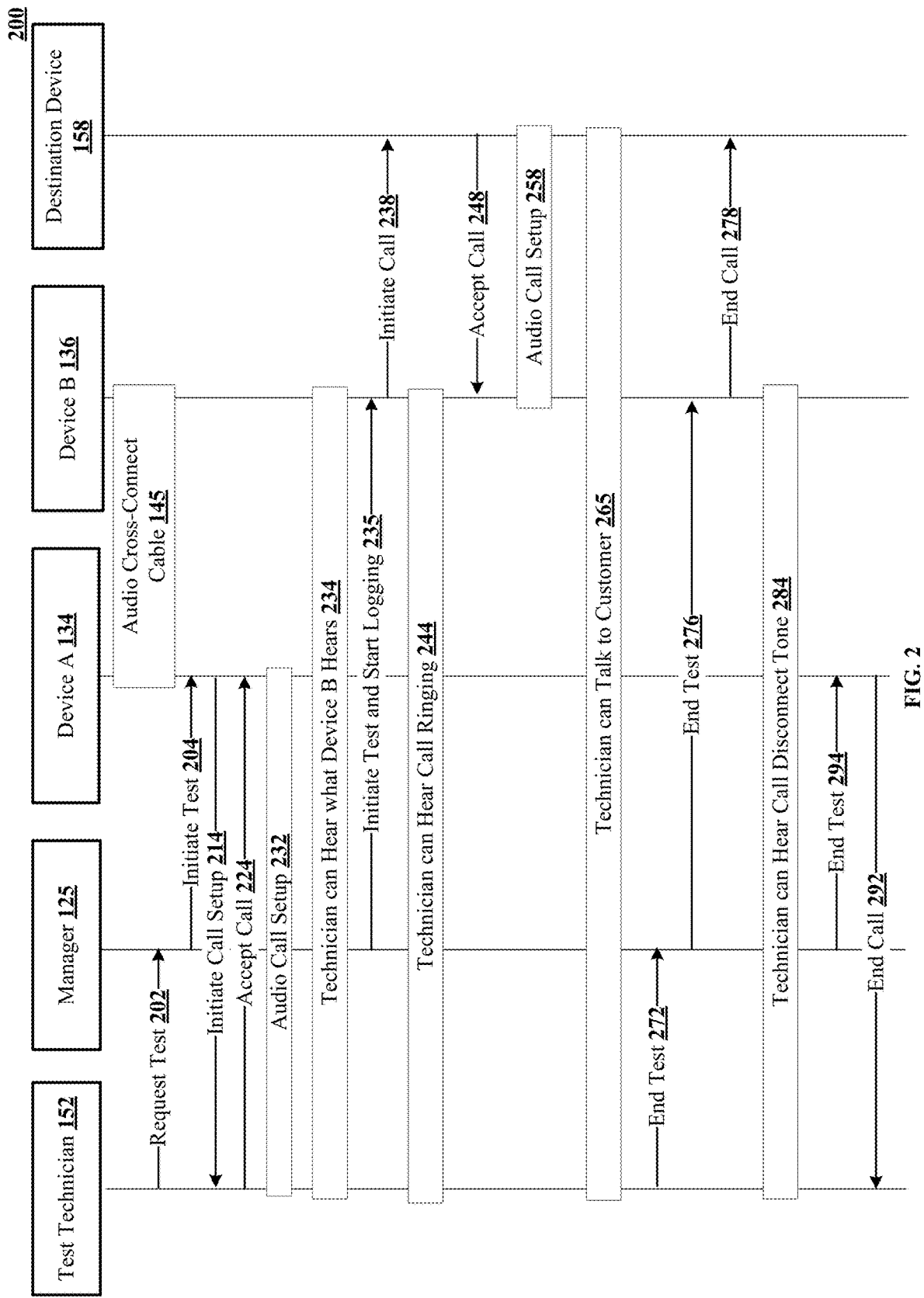
FIG. 2 shows a message diagram for ad hoc testing by a test technician, using the functional blocks

FIG. 2 shows a message diagram 200 for ad hoc testing using the functional blocks described relative to FIG. 1. Device A 134 is connected to device B 136 via audio cross-connect cable 145, described in detail relative to FIG. 4 later. Test technician 152 sends a test request 202 to test manager 125. Test manager 125 initiates a test 204 to device A 134, and device A 134 initiates call setup 214 to test technician 152. Test technician 152 accepts the call 224 from device A 134, establishing an OTA connection between the engineer's device and device A 134, thus completing audio call setup 232. Test technician 152 is able to hear what device B 136 hears 234, due to the presence of the audio cross-connect cable 145. Next test manager 125 initiates a test to device B 136 and starts logging 235, and device B 136 initiates an over-the-air call to destination device 158. Test technician 152 can hear the call to destination device 158 ringing 244. Subscriber at destination device 158 accepts the call 248, resulting in the audio call setup 258 being completed, thus opening a bi-directional audio path between test technician 152, device A 134, device B 136 and destination device 158.

Continuing the description of message diagram 200, test technician 152 can send and hear dual-tone multi-frequency (DTMF) tones from device B 136 to destination device 158 for call interaction, can talk with the customer 265 at destination device 158 and can end the test 272 after the engineer has experienced call ringing and the sound quality of destination device 158. When test technician 152 speaks, the audio follows the path of the device test engineer 152 to device A 134 OTA, from device A 134 to device B 136 over audio cross-connect cable 145 with speaker audio of A routed to microphone of device B 136, and from device B 136 OTA to destination device 158. When the subscriber at destination device 158 speaks, the audio follows the path of destination device 158 to device B 136 OTA, from device B 136 to device A 134 over audio cross-connect cable 145 with speaker audio of device B 136 routed to the microphone of device A 134, and from device A 134 OTA to test technician 152.

Further continuing the description of message diagram 200, test manager 125 validates the audio quality and signals to device B 136 to end the test 276. Device B 136 ends the call 278 with destination device 158. Test technician 152 can hear the call disconnect tone 284 of destination device 158 via audio cross-connect cable 145. Manager 125 later signals device A 134 to end the test 294 and device A 134 ends the over the air call 292 to the test technician 152. Test manager 125 stores logs beginning at least at the initiation of the test through the completion of the call sequence. Next, we describe a typical Android headset circuit, such as that utilized for device A 134 and device B 135.

Figure 3:
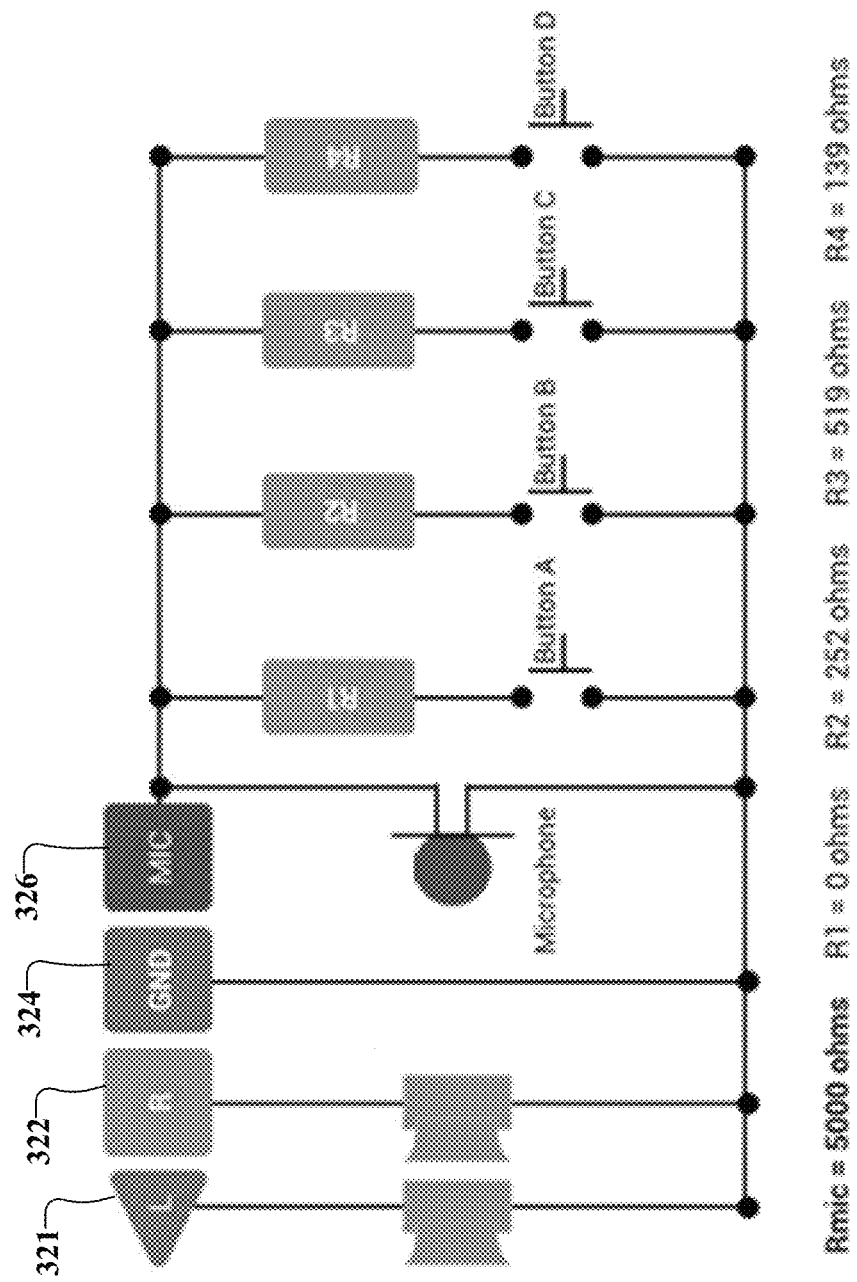
FIG. 3 shows a reference headset test circuit, with stereo audio in, mic out and ground functions.

FIG. 3 shows a reference headset test circuit, with stereo audio in 321, 322, mic out 326 and ground 324 functions. The reference specifies electrical functions, including ear speaker impedance, mic DC resistance and control function equivalent impedances, which refer to the total impedance from the positive mic terminal to GND when a button is pressed with 2.2 V mic bias applied through the 2.2 kOhm resistor. Additional information regarding the Android 3.5 mm plug headset is available at "https://source.android.com/devices/accessories/headset/plug-headset-spec#functions"<accessed on Nov. 25, 2019>.

FIG. 4 shows connections for the disclosed audio cross-connect cable 145 for connecting between two reference headsets: device A handset 134 and device B handset 136, which are each similar to the reference headset of FIG. 3. The disclosed audio cross-connect cable 145 connects right output 422 of device A 134 through resistor R1 432 and capacitor C1 442 to mic 429 of device B 136. Similarly, audio cross-connect cable 145 connects left output 426 of device B handset 136 through capacitor C2 444 and resistor R2 434 to mic 424 of device A handset 134. Ground 423 or device A 134 is connected to ground 428 of device B 136. Example selected values of 1 k ohm resistance and 0.1 µf capacitor are utilized so that connections do not trigger any of the headset functions, in one implementation. Resistance values in a range of 520 ohms to 100 k ohms and capacitor values of 0.05 µf to 10 µf can be selected, in one implementation. Quality typically decreases with increased impedance.

Figure 5A:
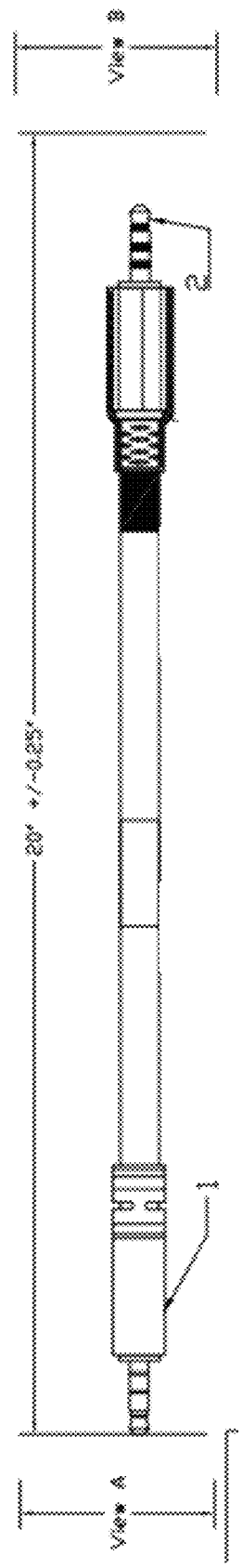
FIG. 5A shows a physical drawing of the disclosed audio cross-connect cable.
Figure 5B:
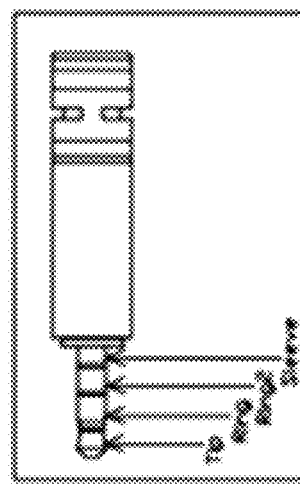
FIG. 5B shows the standard 3.5 mm headset jack of view A of FIG. 5A.
Figure 5C:
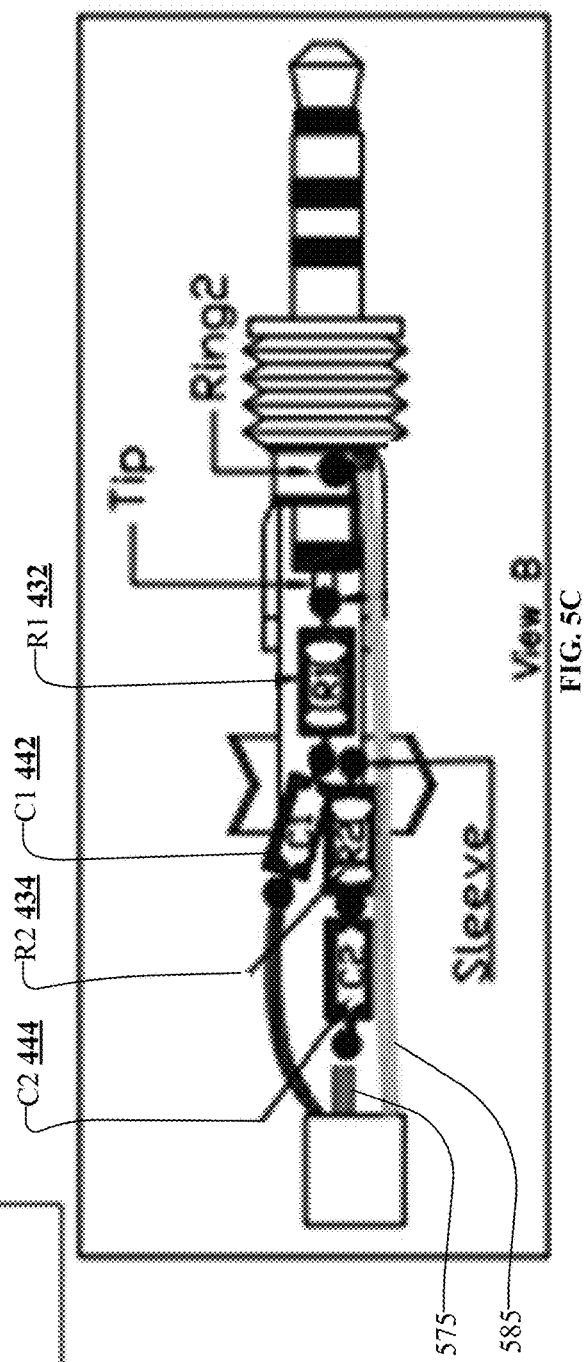
FIG. 5C shows view B of FIG. 5A, with the wiring diagram for disclosed audio cross-connect cable that includes the 3.5 mm stereo audio plug connected to the resistors and capacitors shown in and described relative to FIG. 4.

FIG. 5A shows a physical drawing of the disclosed audio cross-connect cable 145. The cable is twenty inches long in this example implementation. The cable could be longer or shorter in another case. FIG. 5B shows the standard 3.5 mm headset jack of FIG. 5A view A. FIG. 5C shows view B of FIG. 5A, with the wiring diagram for disclosed audio cross-connect cable 145 that includes the 3.5 mm stereo 4 pole audio plug connected to the resistors and capacitors shown in and described relative to FIG. 4.

Figure 6A:
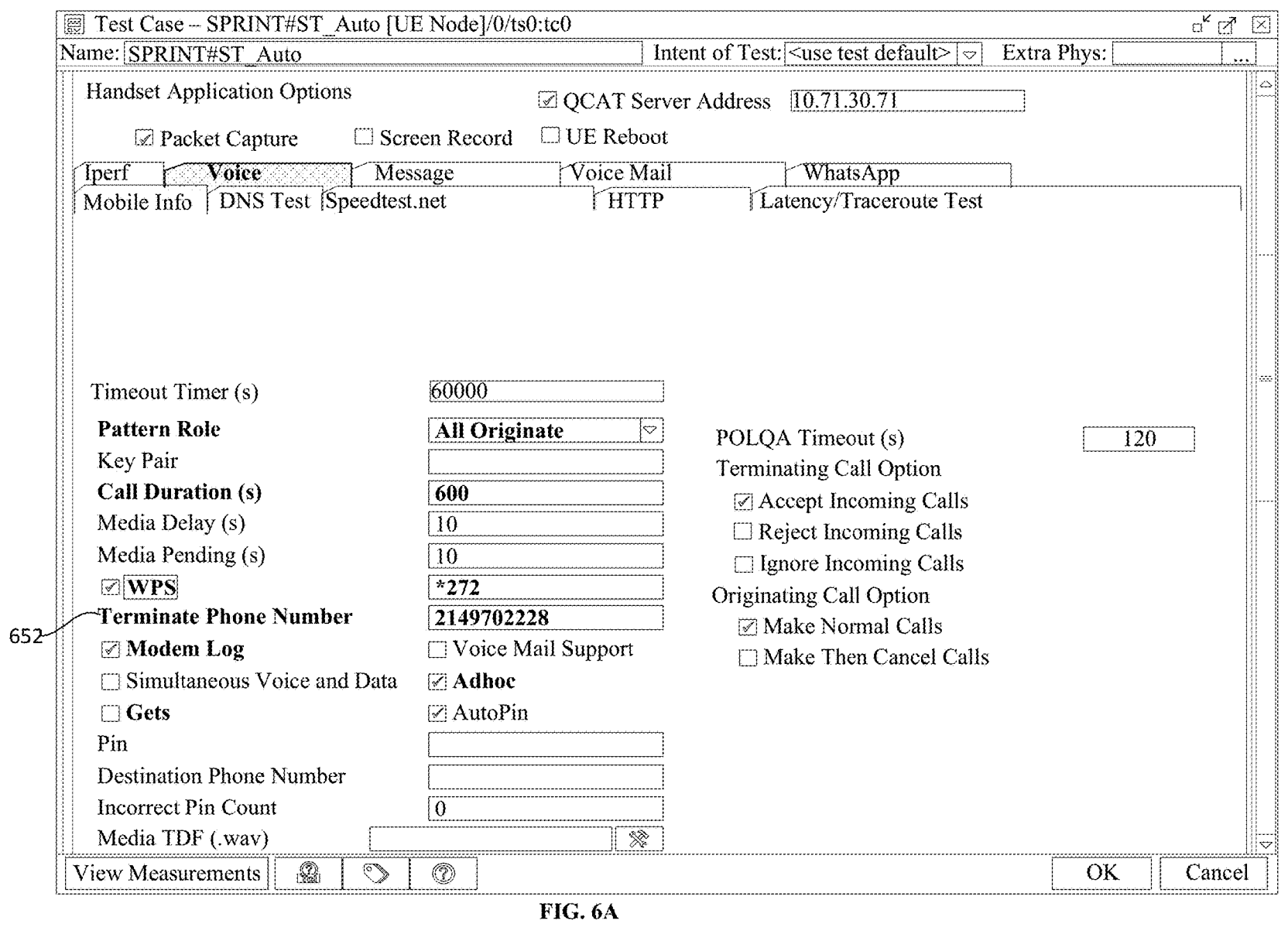
Figure 6B:
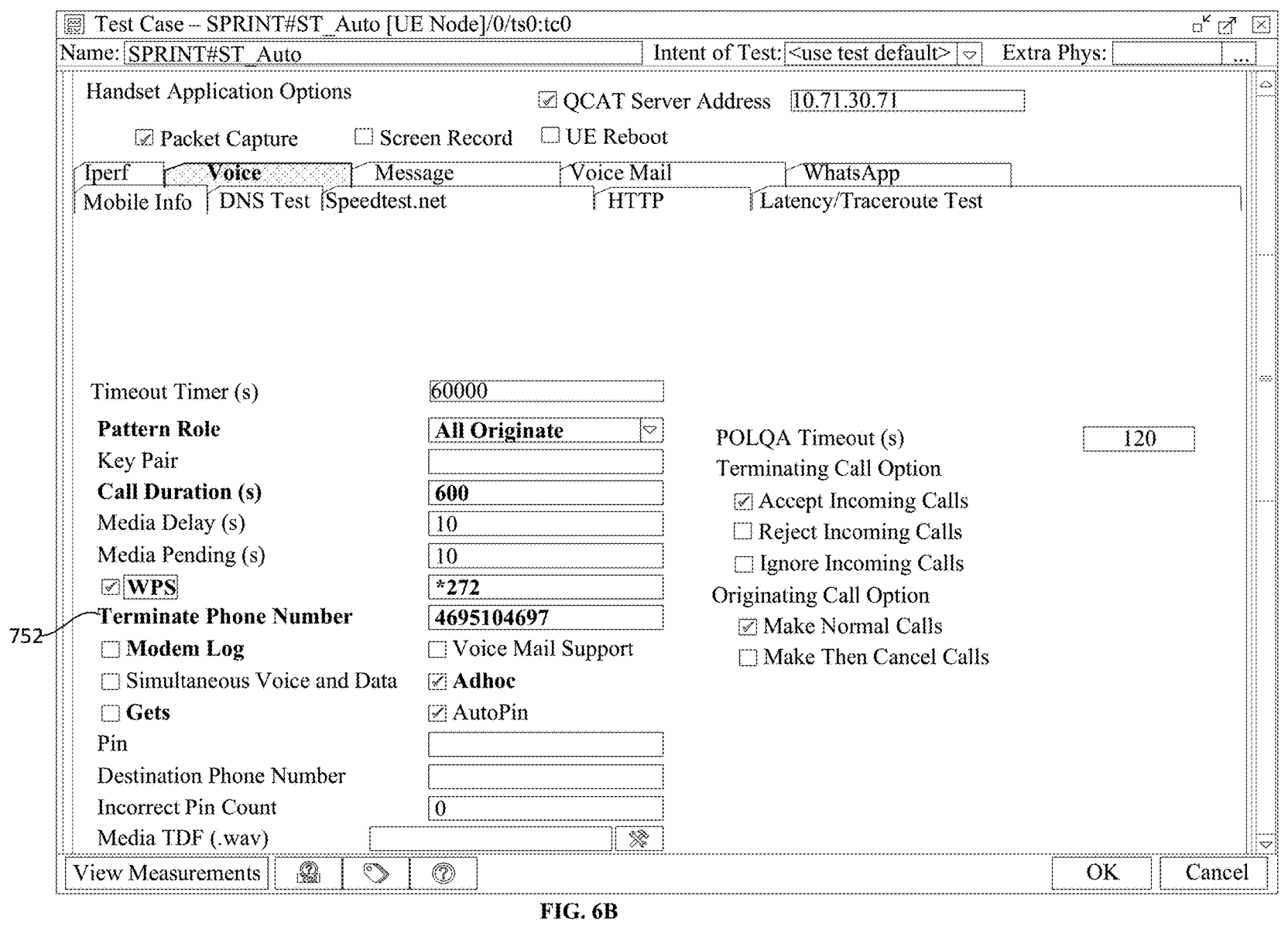

FIG. 6A shows an example user interface, usable by test technician 152 for setting up device B 136, referred to as user equipment (UE) at destination phone number 214-970-2228 652, for a WPS test. FIG. 6B illustrates an example user interface for setting up device A 134, at destination phone number 469-510-4697 752, for a WPS test. Descriptions and values for additional fields of the user interface are described next. With the setting of pattern role of 'all originate', the device under test will dial the 'terminate phone number'. The device under test will wait for the call. In this example the WPS feature is selected, to enable a priority call with prefix *272. When modem log is selected, a log of physical layer transactions are captured and processed. Ad hoc refers to manually starting and ending the call. The 'packet capture' field is checked. Example tcpdump/wireshark results are shown relative to FIG. 10. Wireshark is an open source packet analyzer usable for network troubleshooting, analysis and communications protocol development.

Figure 6D:
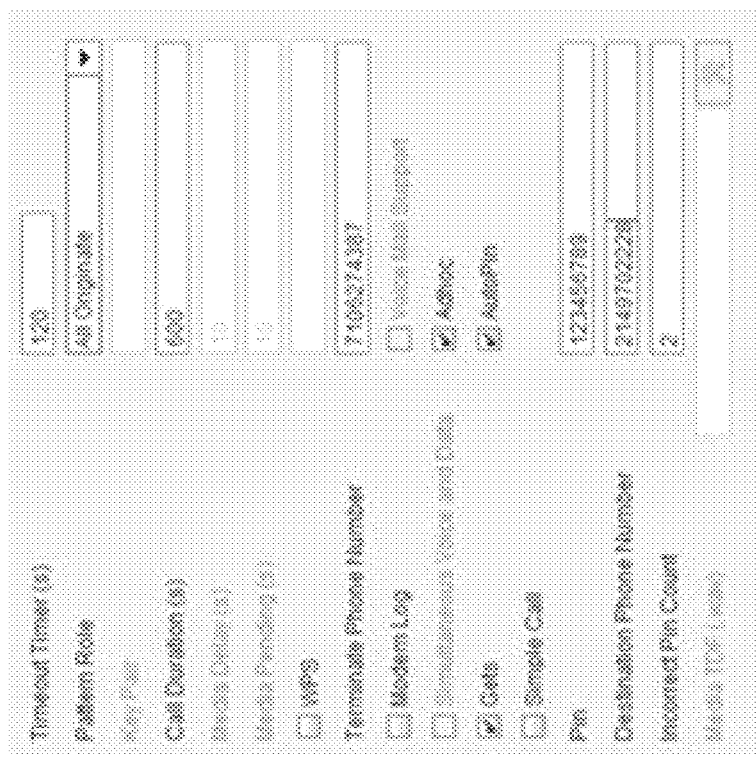
FIG. 6C and FIG. 6D show an example of the differences selected in voice test setup user interface, for a test of GETS.
Figure 6C:
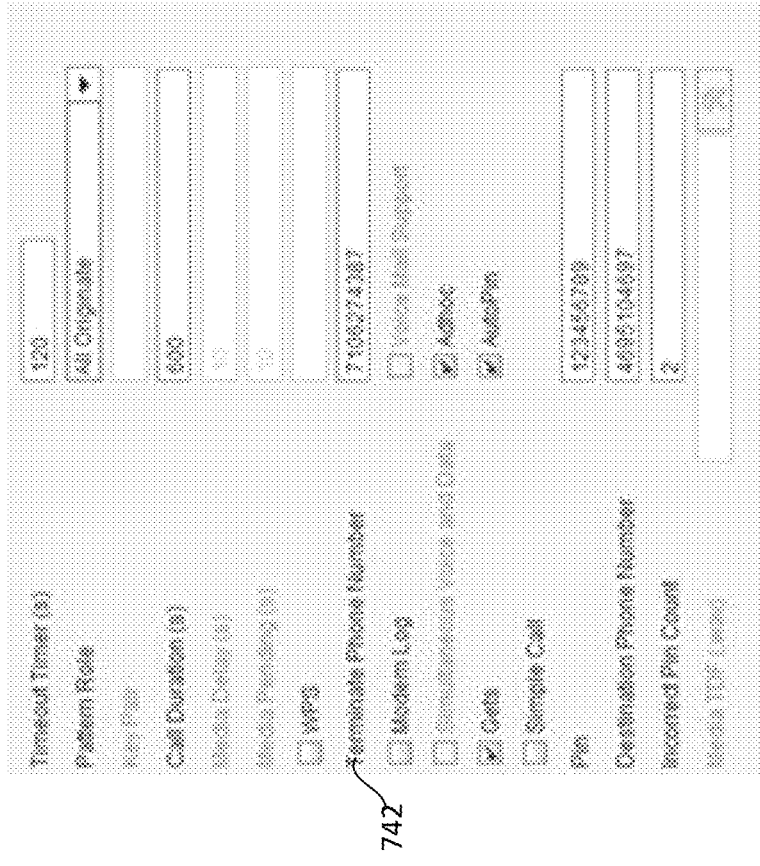

FIG. 6C and FIG. 6D show an example of the differences selected in voice test setup user interface for a test of GETS. 'Gets' is selected to enable a Gets call, which is accessed through a dialing plan and Personal Identification Number (PIN) card verification system. Using common telephone equipment, the user dials a universal access number: 710NCS-GETS (627-4387) 742. A prompt directs the entry of the user's assigned twelve-digit PIN and the destination telephone number. Once the user is authenticated as valid, his or her call receives special treatment. When the 'auto pin' field is checked, the pin is entered automatically after a tone detection, as part of the test setup. The 'destination phone number' field shows the destination phone numbers. The incorrect pin count field specifies how many times to send the incorrect pin before sending the correct pin, for the test. In this example, the incorrect pin is sent two times. The media TDF (.wav) field can specify the media file to be played after call is active, in the automated test case. In one test case, GETS and WPS can be used simultaneously. The GETS test can also be done in case of ad hoc, where auto pin is not selected for device B 136 test case and the technician 152 can enter the pin on his mobile and the DTMF tones are transmitted to device A 134 to device B 136 over cross-connect cable as if the pin has been entered from device B. After the GETS authentication is successful, call is made from device B to destination device 158.

Figure 7:
FIG. 7 illustrates a snippet of a log file for an ad hoc test, which can be analyzed by the test technician.

FIG. 7 illustrates a snippet of a log file for an ad hoc test, which can be analyzed by the test technician.

For emergency calls made from cell phones, wireless priority service (WPS) provides priority on the connection between the user's cell phone and the cell tower, as an add-on feature to existing cellular service, subscribed on a per-cell phone basis. The U.S. government requires all WPS service providers to have high service availability, so cellular service providers need a user equipment-based solution to test and debug their networks.

Figure 8:
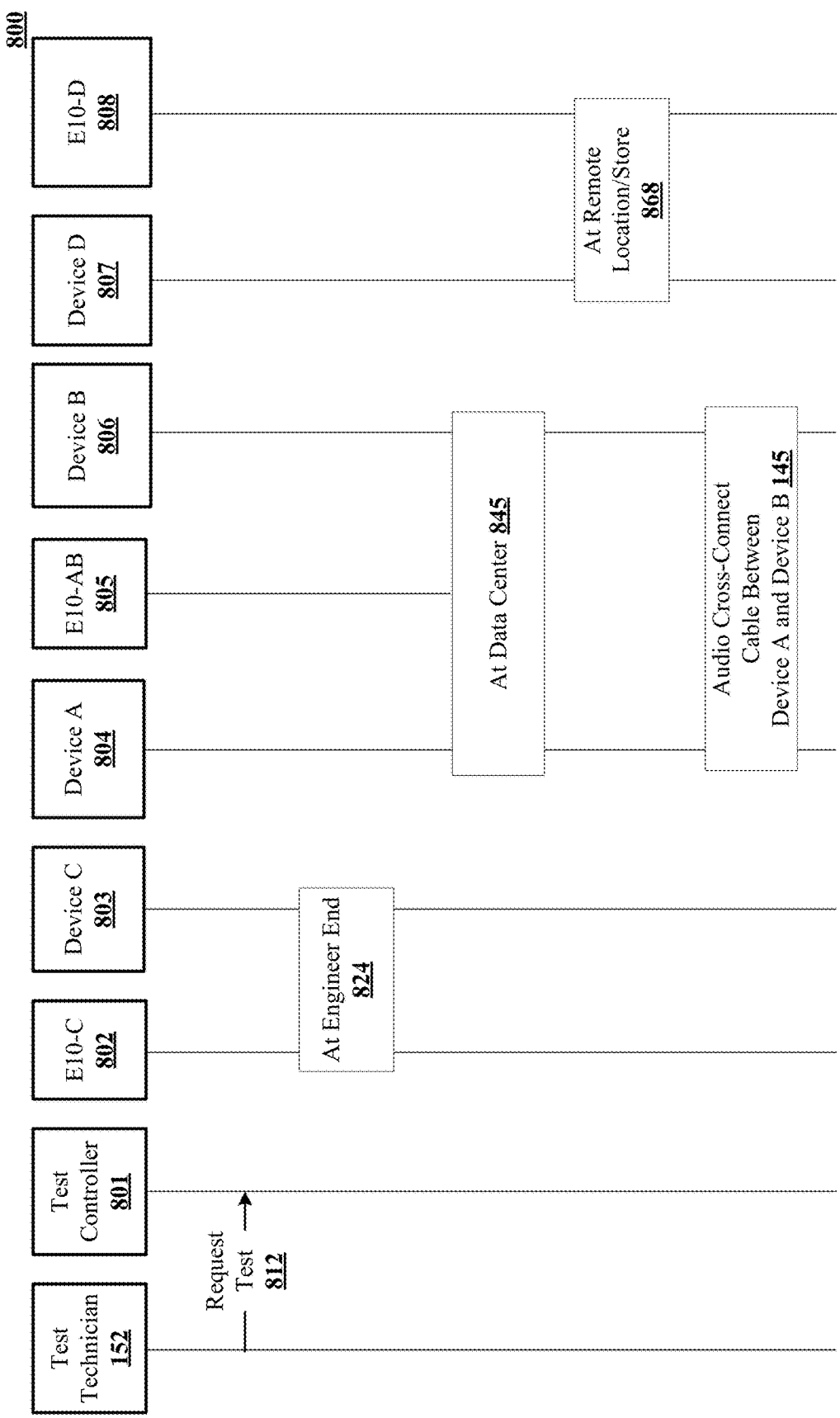
FIG. 8 illustrates a block diagram for automated testing of a cellular connection from a specific location without being near that location.

FIG. 8 illustrates a block diagram for WPS automated testing via the disclosed technology. Master test controller 801 is configured as a test server with network connections to a set of standalone test managers: E10-C 802, E10-AB 805 and E10-D 808 for automated testing. Test manager E10-C 802 is connected to device C 803 at a first location, the test engineering end 824. Test manager E10-AB 805 is connected to device A 804 and device B 906 at a counterpart location, data center 845. Test manager E10-D 808 is connected to device D 807 at a second location, the remote location/store 868. Audio cross-connect cable 145 adapts impedance and resistance of the connection between the first mobile phone device A 804 and second mobile phone device B 806 to feed output of respective speakers to respective microphones, according to specifications for the mobile phone, and further inhibits transmission between the first and second phones of signals that match the mobile phone specifications for button presses.

Figure 9:
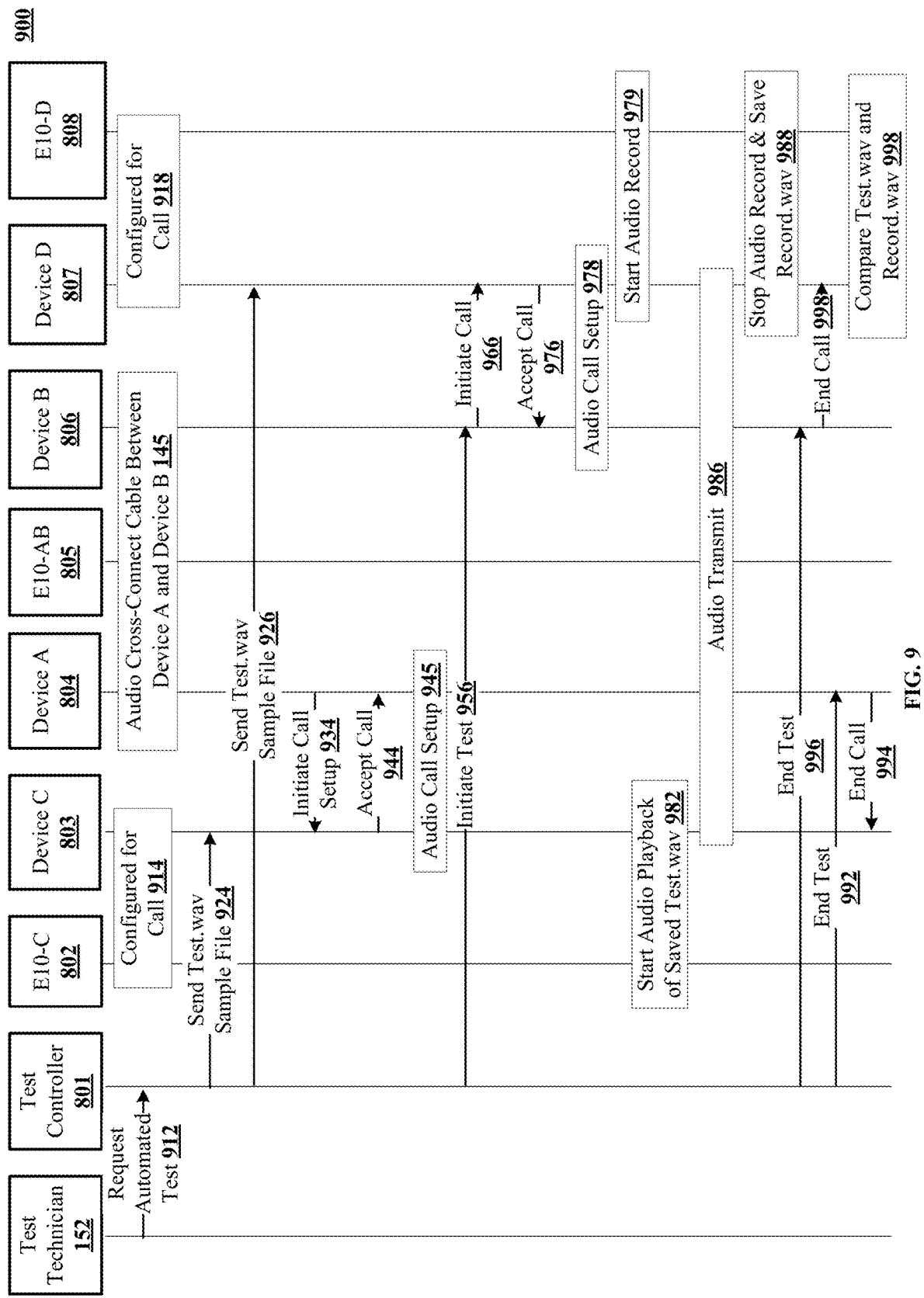
FIG. 9 shows an example message diagram flow for automated testing, for a test system that utilizes functional blocks configured as described relative to FIG. 8.

FIG. 9 shows an example message diagram flow for automated testing, for a test system that utilizes functional blocks configured as described relative to FIG. 8. Test technician 152 sends a request for automated test 912 to master test controller 801. Test manager E10-C 802 establishes a first test call connection between device C 803 and device A 804 for the call 914. Audio cross-connect cable 145 connects device A 804 and device B 806. Test manager E10-D 808 establishes a second test call connection between device B 806 and device D 807 for the call 918. After the configuration is complete, test controller 801 sends test.wav sample file 924 to device C 803 and sends test.wav sample file 926 to device D 807. Device A 134 initiates call setup 934 to device C 803, and device C 803 accepts the call 944, completing audio call setup 945. Then, test controller 801 initiates test 956 to device B 806, and device B initiates a call 966 to device D 807. Device D 807 accepts the call 976, completing audio call setup 978.

Continuing the description of the automated test, test manager E10-D 808 starts audio record 979 of device D 807. Test manager E10-C 802 starts audio playback of the saved test.wav 982 to device C 803, which audio transmits test.wav 988 to device D 807 OTA between device C and device A 804, then via audio cross-connect cable 145 between device A 804 and device B 806, then OTA between device B 806 and device D 807. When the audio transmission is complete, test manager E10-D 808 stops recording and saves the received record.wav 989. Master test controller 801 ends the test 996, resulting in device B 806 ending the call 998 with device D 807. Master test controller 801 also ends the test 992 for device A 804, which results in device A ending the OTA call 994 with device C 803.

Further continuing the description of the automated test, test controller E10-D 808 compares test.wav and record.wav to obtain results of the automated test. In one implementation the resulting comparison results are stored as mean opinion scores (MOS). In one implementation, test controller utilizes Perceptual Objective Listening Quality Analysis (POLQA), the global standard for benchmarking voice quality of fixed, mobile and IP based networks. A different analysis tool can be used in a different implementation.

For some implementations for automated testing of connections, logs of the transactions, similar to those shown for the ad hoc scenario shown in FIG. 7, are analyzed and can be considered along with the MOS. Wireshark is a packet analyzer tool, usable for network troubleshooting and analysis. FIG. 10 illustrates an example snippet of a Wireshark log for the WPS test. The highlighted line '21' in the upper half of the screen is selected and the details for that log entry are shown in Frame 21, which is 993 bytes and whose details are listed in the lower quadrant of FIG. 10. Session initiation protocol (SIP) is used for VoLTE and Vo5G Call setup. The displayed sample wireshark output shows SIP Registration and Call setup. Lines one through four show SIP registration. Line 21 shows A SIP invite, initiating a call. In line 211, the call is active. Lines 215 through 210 show packets being exchanged.

Test manager 125 and master test controller 801 both support testing of Wi-Fi and IMS networks, including over-the-air LTE testing as well as mobile core which enables a device with wireless capabilities to connect to the cellular network independent of its radio technologies.

Next, we describe a computer system usable for ad hoc testing a connection between a subscriber mobile phone and a counterpart location with which the subscriber is having trouble, and automated testing of a connection between a first location and a second location through a counterpart location in a wireless communications network.

Figure 11:
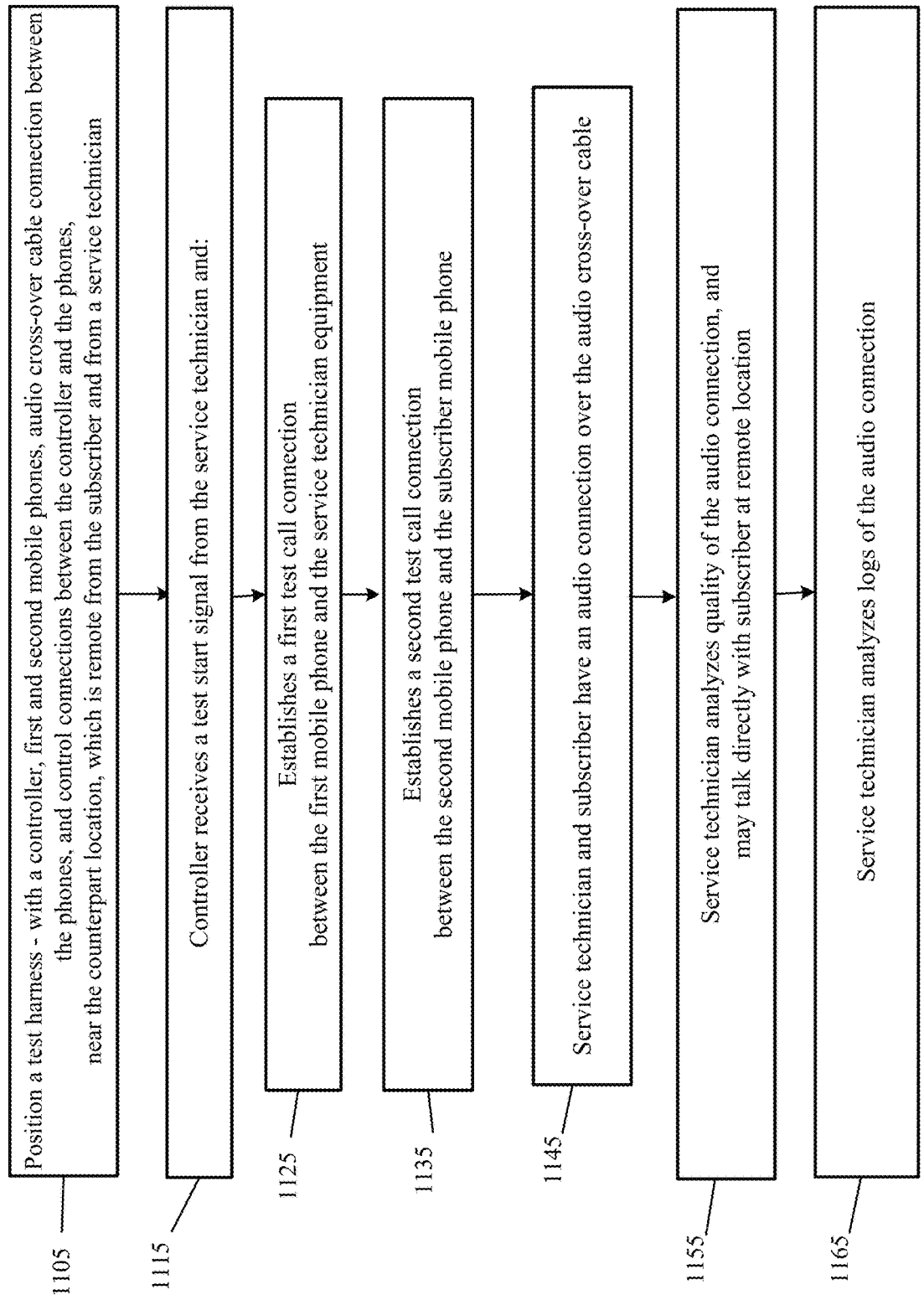
FIG. 11 shows a representative workflow for ad hoc testing a connection between a subscriber mobile phone and a counterpart location with which the subscriber is having trouble.

FIG. 11 shows a representative method of ad hoc testing a connection between a subscriber mobile phone and a counterpart location with which the subscriber is having trouble. Flowchart 1100 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to a Spirent controller.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 11 begins with action 1105 positioning a test harness near the counterpart location, remote from the subscriber and from a service technician. The test harness includes a controller, first and second mobile phones, an audio cross-over cable connection between the mobile phones, and control connections between the controller and the mobile phones. The audio cross-over cable adapts impedance and resistance of the connection between the first and second mobile phones to feed output of respective speakers to respective microphones, according to specifications for the mobile phone, and inhibits transmission between the first and second phones of signals that match the mobile phone specifications for button presses.

Process 1100 continues at action 1115 with the controller receiving a test start signal from the service technician and establishing a test connection between service technician equipment and subscriber equipment through the counterpart location.

The process continues at action 1125 with establishing a first test call connection between the first mobile phone and the service technician equipment.

Action 1135 includes establishing a second test call connection between the second mobile phone and the subscriber mobile phone.

At process 1100 action 1145 the service technician and the subscriber have an audio connection over the audio cross-over cable.

Action 1155 the service technician analyzes the quality of the audio connection, and SEP may talk directly with the subscriber at the remote location.

At action 1165, the service technician analyzes logs of the audio connection.

Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

A different representative method utilizes actions for automated testing a connection between a first location and a second location through a counterpart location, to establish a test of audio communications between first and second locations through a counterpart location, utilizing the disclosed audio cross-over cable. Example actions will readily occur to those skilled in the art. A block diagram of a computer system usable for testing a connection between a subscriber and a location with which the subscriber is having problems is described.

Computer System

Figure 12:
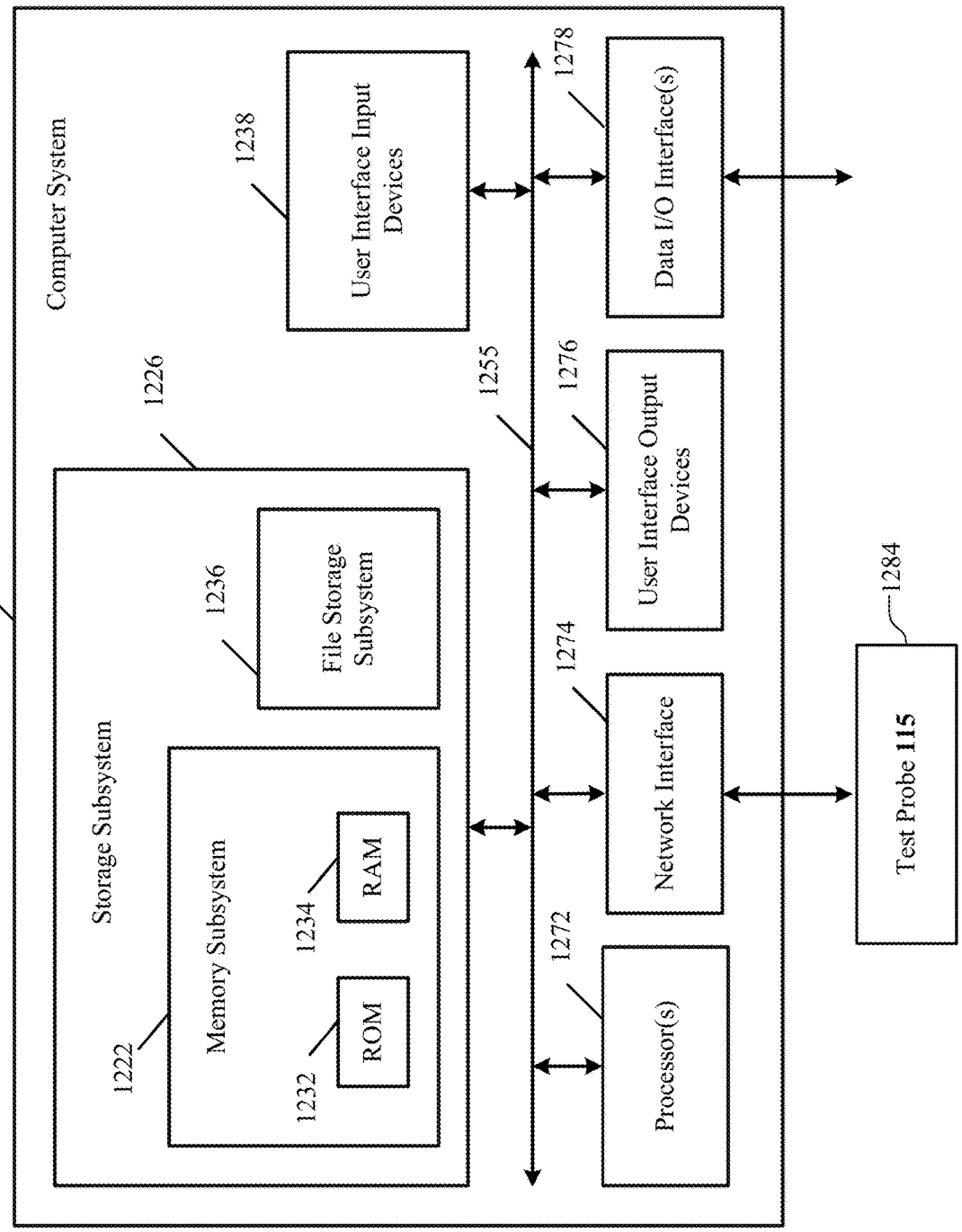
FIG. 12 depicts a block diagram of an exemplary system for testing a connection between a subscriber's mobile phone and a particular location with which the subscriber is having trouble connecting, and for automated testing of a cellular connection from a specific location without being near that location, according to two implementations of the technology disclosed.

FIG. 12 is a simplified block diagram of a computer system 1210 that can be used for ad hoc testing a connection between a subscriber mobile phone and a counterpart location with which the subscriber is having trouble. Computer system 1210 can also be used for automated testing of a connection between a first location and a second location through a counterpart location according to one implementation of the technology disclosed.

Computer system 1200 includes at least one central processing unit (CPU) 1272 that communicates with a number of peripheral devices via bus subsystem 1255. These peripheral devices can include a storage subsystem 1226 including, for example, memory devices and a file storage subsystem 1236, user interface input devices 1238, user interface output devices 1276, and a network interface subsystem 1274. The input and output devices allow user interaction with computer system 1200. Network interface subsystem 1274 provides an interface to a communication network 1284, and to corresponding interface devices in other computer systems.

In one implementation, the test probe 115 of FIG. 1 is communicably linked to the storage subsystem 1226 and the user interface input devices 1238. User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1200.

User interface output devices 1276 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1226 stores programming and data constructs that provide the functionality of some or all of the modules and methods described herein.

Memory subsystem 1222 used in the storage subsystem 1210 can include a number of memories including a main random access memory (RAM) 1232 for storage of instructions and data during program execution and a read only memory (ROM) 1234 in which fixed instructions are stored. A file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1236 in the memory subsystem 1222, or in other machines accessible by the processor.

Bus subsystem 1255 provides a mechanism for letting the various components and subsystems of computer system 1200 communicate with each other as intended. Although bus subsystem 1255 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 12 is intended only as a specific example for purposes of illustrating the preferred embodiments of the present invention. Many other configurations of computer system 1200 are possible having more or less components than the computer system depicted in FIG. 12.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of ad hoc testing a connection between a subscriber mobile phone and a counterpart location with which the subscriber is having trouble, includes positioning a test harness near the counterpart location, remote from the subscriber and from a service technician. The test harness includes a controller, first and second mobile phones, an audio cross-over cable connection between the mobile phones, and control connections between the controller and the mobile phones, and the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses. The disclosed method also includes the controller receiving a test start signal from the service technician and establishing a test connection between service technician equipment and subscriber equipment through the counterpart location, including establishing a first test call connection between the first mobile phone and the service technician equipment, and establishing a second test call connection between the second mobile phone and the subscriber mobile phone, whereby the service technician and the subscriber have an audio connection over the audio cross-over cable.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations of the disclosed method, each of the control connections between the controller and the mobile phones is a wired connection. For other implementations, each of the control connections between the controller and the mobile phones is a wireless connection with different key performance indicators.

For many disclosed implementations, the impedance values utilize resistor values and capacitor values tuned as an impedance matching network. The resistor values are in a range of 520 ohms to 100 thousand ohms. The capacitor values are in a range of 0.05 microfarads and 10 microfarads in one implementation. The higher the impedance value, the lower the audio quality.

For some implementations of the disclosed method, the two mobile phones are commercially available mobile devices. In one implementation, the two mobile phones are commercially available Android devices.

One implementation of the disclosed method further includes the controller establishing an outgoing test connection between service technician equipment and subscriber equipment through the counterpart location. In another implementation, the disclosed method further includes the controller establishing an incoming test connection between service technician equipment and subscriber equipment through the counterpart location. In one implementation, ad hoc testing of the connection invokes a vertical service code to receive priority consideration on a wireless network for wireless priority service (WPS) and/or government emergency telecommunications service (GETS).

Some implementations of the disclosed method also include the service technician analyzing logs of the audio connection.

Another implementation of a disclosed method of automated testing a connection between a first location and a second location through a counterpart location, includes positioning a test harness near the counterpart location, remote from the first location and the second location, wherein the test harness includes a counterpart controller, first and second mobile phones, an audio cross-over cable connection between the mobile phones, and control connections between the test controller and the mobile phones, and wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses. The method includes the counterpart controller receiving a test start signal and establishing a test connection between first and second equipment at the first and second locations, respectively, through the counterpart location, including establishing a first test call connection between the first mobile phone and first equipment at the first location, and establishing a second test call connection between the second mobile phone and second equipment at the second location, whereby the equipment at the first and second locations have an audio connection over the audio cross-over cable. The disclosed method further includes conducting an automated test of audio communications between the first and second locations through the counterpart location.

Some implementations of the disclosed method further include processing results of the automated test to determine values for mean opinion score (MOS) for the connection. Some implementations also include identifying connection problems by analyzing the MOS.

For some implementations of the disclosed method, the automated testing of the connection invokes a vertical service code to receive priority consideration on the wireless network for wireless priority service (WPS) and/or government emergency telecommunications service (GETS).

In another implementation, a disclosed system for testing a connection between a subscriber mobile phone and a counterpart location with which the subscriber is having trouble, comprises a test harness positioned near the counterpart location, remote from the subscriber and from a service technician, wherein the test harness includes a controller, first and second mobile phones, an audio cross-over cable connection between the mobile phones, and control connections between the controller and the mobile phones, and wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses. The controller is configurable to receive a test start signal from the service technician and establish a test connection between service technician equipment and subscriber equipment through the counterpart location, including establishing a first test call connection between the first mobile phone and the service technician equipment, and establishing a second test call connection between the second mobile phone and the subscriber mobile phone. The service technician and the subscriber have an audio connection over the audio cross-over cable. The disclosed system can implement actions of the disclosed method described supra.

In another implementation, a disclosed system for automated testing a connection between a first location and a second location through a counterpart location, the system comprises a test harness positioned near the counterpart location, remote from the first location and the second location, wherein the test harness includes a counterpart controller, first and second mobile phones, an audio cross-over cable connection between the mobile phones, and control connections between the test controller and the mobile phones, and wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses. The counterpart controller is configurable to receive a test start signal and establish a test connection between first and second equipment at the first and second locations, respectively, through the counterpart location, including establishing a first test call connection between the first mobile phone and first equipment at the first location and establishing a second test call connection between the second mobile phone and second equipment at the second location. For the disclosed system, the equipment at the first and second locations have an audio connection over the audio cross-over cable and an automated test conducted of audio communications between the first and second locations through the counterpart location. The disclosed system can further include processing results of the automated test to determine values for MOS for the connection.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to

We claim as follows:

1. A method of ad hoc testing a connection between a subscriber mobile phone and a counterpart location with which the subscriber is having trouble, including:
   positioning a test harness near the counterpart location, remote from the subscriber and from a service technician,
      wherein the test harness includes a controller, first and second mobile phones, an audio cross-over cable connection between the mobile phones, and control connections between the controller and the mobile phones, and
      wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses;
   the controller receiving a test start signal from the service technician and establishing a test connection between service technician equipment and subscriber equipment through the counterpart location, including:
      establishing a first test call connection between the first mobile phone and the service technician equipment; and
      establishing a second test call connection between the second mobile phone and the subscriber mobile phone; and
      whereby the service technician and the subscriber have an audio connection over the audio cross-over cable.

2. The method of claim 1, wherein each of the control connections between the controller and the mobile phones is a wired connection.

3. The method of claim 1, wherein each of the control connections between the controller and the mobile phones is a wireless connection.

4. The method of claim 1, wherein the impedance values utilize resistor values and capacitor values tuned as an impedance matching network.

5. The method of claim 4, wherein the resistor values are in a range of 520 ohms to 100 thousand ohms and the capacitor values are in a range of 0.05 microfarads and 10 microfarads.

6. The method of claim 1, wherein the mobile phones are commercially available devices.

7. The method of claim 1, further including the controller establishing an outgoing test connection between service technician equipment and subscriber equipment through the counterpart location.

8. The method of claim 1, further including the controller establishing an incoming test connection between service technician equipment and subscriber equipment through the counterpart location.

9. The method of claim 1, further including the service technician analyzing logs of the audio connection.

10. A method of automated testing a connection between a first location and a second location through a counterpart location, including:
   positioning a test harness near the counterpart location, remote from the first location and the second location,
      wherein the test harness includes a counterpart controller, first and second mobile phones, an audio cross-over cable connection between the mobile phones, and control connections between the test controller and the mobile phones, and
      wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses;
   the counterpart controller receiving a test start signal and establishing a test connection between first and second equipment at the first and second locations, respectively, through the counterpart location, including:
      establishing a first test call connection between the first mobile phone and first equipment at the first location; and
      establishing a second test call connection between the second mobile phone and second equipment at the second location;
      whereby the equipment at the first and second locations have an audio connection over the audio cross-over cable; and
   conducting an automated test of audio communications between the first and second locations through the counterpart location.

11. The method of claim 10, further including processing results of the automated test to determine values for mean opinion score (abbreviated MOS) for the connection.

12. The method of claim 11, further including identifying connection problems by analyzing the MOS.

13. The method of claim 10, wherein the control connections between the controller and the mobile phones are one of a wired connection and a wireless connection.

14. The method of claim 10, wherein the impedance values utilize resistor values and capacitor values tuned as an impedance matching network.

15. The method of claim 14, wherein the resistor values are in a range of 520 ohms to 100 thousand ohms and the capacitor values are in a range of 0.05 microfarads and 10 microfarads.

16. The method of claim 10, wherein the mobile phones are commercially available mobile devices.

17. The method of claim 10, wherein the automated testing of the connection invokes a vertical service code to receive priority consideration on a wireless network for wireless priority service (abbreviated WPS) and/or government emergency telecommunications service (abbreviated GETS).

18. A system for testing a connection between a subscriber mobile phone and a counterpart location with which the subscriber is having trouble, the system comprising:
   a test harness positioned near the counterpart location, remote from the subscriber and from a service technician,
      wherein the test harness includes a controller, first and second mobile phones, an audio cross-over cable connection between the mobile phones, and control connections between the controller and the mobile phones, and
      wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses;

wherein the controller is configurable to receive a test start signal from the service technician and establish a test connection between service technician equipment and subscriber equipment through the counterpart location, including establishing a first test call connection between the first mobile phone and the service technician equipment; and establishing a second test call connection between the second mobile phone and the subscriber mobile phone; and whereby the service technician and the subscriber have an audio connection over the audio cross-over cable.

19. A system for automated testing a connection between a first location and a second location through a counterpart location, the system comprising:

a test harness positioned near the counterpart location, remote from the first location and the second location, wherein the test harness includes a counterpart controller, first and second mobile phones, an audio cross-over cable connection between the mobile phones, and control connections between the test controller and the mobile phones, and wherein the audio cross-over cable adapts impedance and resistance of the connection between the first and second mobile phones to feed output of respective speakers to respective microphones, according to specifications for the mobile phone, and further inhibits transmission between the first and second phones of signals that match the mobile phone specifications for button presses;

wherein the counterpart controller is configurable to receive a test start signal and establish a test connection between first and second equipment at the first and second locations, respectively, through the counterpart location, including:

establishing a first test call connection between the first mobile phone and first equipment at the first location; and establishing a second test call connection between the second mobile phone and second equipment at the second location;

whereby the equipment at the first and second locations have an audio connection over the audio cross-over cable; and an automated test conducted of audio communications between the first and second locations through the counterpart location.

20. The system of claim 19, further including processing results of the automated test to determine values for mean opinion score (abbreviated MOS) for the connection.

* * * * *